(12) United States Patent
Poussin et al.

(10) Patent No.: US 12,024,378 B2
(45) Date of Patent: Jul. 2, 2024

(54) FILLING SYSTEM WITH COMPENSATED FLOW RATE

(71) Applicant: CREALYST-GROUP, Semur-en-Vallon (FR)

(72) Inventors: Bernard Poussin, Semur-en-Vallon (FR); Guillaume Poussin, Saint Germain de la Grange (FR)

(73) Assignee: CREALYST-GROUP, Semur-en-Vallon (FR)

( * ) Notice: Subject to any disclaimer, the term of this patent is extended or adjusted under 35 U.S.C. 154(b) by 739 days.

(21) Appl. No.: 17/256,439

(22) PCT Filed: Jul. 1, 2019

(86) PCT No.: PCT/EP2019/067629
§ 371 (c)(1),
(2) Date: Dec. 28, 2020

(87) PCT Pub. No.: WO2020/007806
PCT Pub. Date: Jan. 9, 2020

(65) Prior Publication Data
US 2021/0269263 A1    Sep. 2, 2021

(30) Foreign Application Priority Data
Jul. 4, 2018 (FR) ..................... 18/56161

(51) Int. Cl.
*B65G 69/04* (2006.01)
*B01J 8/00* (2006.01)
*G05D 7/01* (2006.01)

(52) U.S. Cl.
CPC .......... *B65G 69/0458* (2013.01); *B01J 8/002* (2013.01); *B01J 8/003* (2013.01); *B01J 8/0045* (2013.01); *G05D 7/0186* (2013.01)

(58) Field of Classification Search
CPC ....... B65G 69/0458; B01J 8/003; B01J 8/002; B01J 8/0045; G05D 7/0186
(Continued)

(56) References Cited

U.S. PATENT DOCUMENTS 3,620,390 A * 11/1971 McKinnon ......... B65G 69/0458
414/301
4,564,328 A * 1/1986 Loutaty .................... B01J 8/002
239/654
(Continued)

FOREIGN PATENT DOCUMENTS

| CA | 1 265 469 A1 | 2/1990 |
|---|---|---|
| CN | 2487709 Y | 4/2002 |

(Continued)

OTHER PUBLICATIONS

International Search Report dated Sep. 27, 2019 issued in PCT/EP2019/067629.

*Primary Examiner* — Timothy P. Kelly
*Assistant Examiner* — Christopher M Afful
(74) *Attorney, Agent, or Firm* — Scully, Scott, Murphy & Presser, P.C.

(57) ABSTRACT

The invention relates to a filling system (1) for a container intended to store solid particles, the system (1) being arranged to cooperate with a supply device for feeding solid particles and comprising a device (5) for distributing the solid particles, which has at least one separator element (9) intended to receive and selectively distribute the solid particles toward a dispensing device (7), the separator element (9) comprising a receiving body (11) for receiving solid particles, one end of which has an axial opening (13) for continuously feeding the dispensing device (7), the dispensing device (7) comprising at least one scattering element (21) for homogeneously filling the container with solid particles, which is driven by a drive shaft passing through (Continued)

the axial opening (13). According to the invention, the receiving body (11) comprises a frustoconical part (11a) which has the axial opening (13) and flares away from the axial opening (13), the frustoconical part (11a) being extended by a tubular part (11b) comprising at least one radial opening (15) which is located upstream of the axial opening (13) and is arranged to direct the solid particles without encountering those exiting the axial opening (13) before arriving in the dispensing device (7) from a predetermined amount of solid particles stored in the frustoconical part (11a) of the receiving body (11) in order to guarantee a minimum flow of solid particles even in the event of variations in the flow rate of the supply device.

15 Claims, 3 Drawing Sheets

(58) Field of Classification Search
USPC .............. 239/687; 141/1; 414/808, 299, 301
See application file for complete search history.

(56) References Cited

U.S. PATENT DOCUMENTS

| | | | | |
|---|---|---|---|---|
| 5,906,293 | A | * | 5/1999 | Geiser ................ B65G 69/0458 |
| | | | | 222/1 |
| 8,948,910 | B2 | * | 2/2015 | Cottard ................. G01F 23/296 |
| | | | | 422/219 |
| 2010/0256803 | A1 | | 10/2010 | Cottard et al. |
| 2012/0205007 | A1 | | 8/2012 | Girard et al. |
| 2012/0237322 | A1 | | 9/2012 | Toline et al. |
| 2018/0128356 | A1 | * | 5/2018 | Koehler ............. B65G 65/4836 |

FOREIGN PATENT DOCUMENTS

| | | |
|---|---|---|
| CN | 102225721 A | 10/2011 |
| CN | 102264463 A | 11/2011 |
| CN | 102556692 A | 7/2012 |
| CN | 202657702 U | 1/2013 |
| FR | 2923816 A1 | 5/2009 |
| FR | 2949755 A1 | 3/2011 |
| GB | 2168330 A | 6/1986 |
| JP | S61-44232 U | 3/1986 |
| JP | 2000-110970 A | 4/2000 |

* cited by examiner

FILLING SYSTEM WITH COMPENSATED FLOW RATE

TECHNICAL FIELD OF THE INVENTION

The present invention relates to the field of filling containers with solid particles such as grains or granules. These containers can for example be reactors for the petroleum or chemical industry or silos for the storage of cereals, fertilizers or any other product in the form of solid particles.

TECHNICAL BACKGROUND OF THE INVENTION

Such containers are filled by transferring the solid particles from hoppers or funnels, which discharge the solid particles into the container through flexible sleeves or rigid pipes. Generally, the aim is to fill the container with the maximum of solid product and to have a distribution of the solid particles which is as homogeneous as possible in terms of particle size in order to come as close as possible to the optimum filling determined theoretically.

Thus, for grain storage silos, it is necessary to be able to store the largest possible quantity of grain while avoiding particle size segregation phenomena in order to guarantee good ventilation so as to avoid the proliferation of insects (such as weevils) in particular at the center of the stored mass.

The feed devices used for cereal grain silos are highly varied. In addition, no particular standard is imposed regarding the flow rate to be observed for these feed devices. In this way, homogeneous filling can be made difficult because of the variable flow rate of the feed device used, or the variable flow rates of the feed devices used for the same silo, which depends in particular on the arrival of the trucks bringing the cereal grains.

SUMMARY OF THE INVENTION

The object of the invention is to remedy these drawbacks by proposing a filling system for a container intended to store solid particles which is not or is only slightly sensitive to variations in the flow rate for delivering the solid particles in order to maintain a minimum flow rate which is able to guarantee the filling of the container through a homogeneous rain of solid particles.

To this end, the invention relates to a filling system for a container intended to store solid particles, the system being arranged to cooperate with a supply device for feeding solid particles and comprising a device for distributing the solid particles, which has at least one separator element intended to receive and selectively distribute the solid particles toward a dispensing device, the separator element comprising a receiving body for receiving solid particles, one end of which has an axial opening for continuously feeding the dispensing device, the dispensing device comprising at least one scattering element for homogeneously filling the container with solid particles, which is driven by a drive shaft passing through the axial opening, characterized in that the receiving body comprises a frustoconical part which comprises the axial opening and flares away from the axial opening, the frustoconical part being extended by a tubular part comprising at least one radial opening which is located upstream of the axial opening and is arranged to direct the solid particles without encountering those exiting the axial opening before arriving in the dispensing device from a predetermined amount of solid particles stored in the frustoconical part of the receiving body in order to guarantee a minimum flow of solid particles even in the event of variations in the flow rate of the supply device.

Advantageously according to the invention, the system therefore comprises a receiving body capable of maintaining a minimum flow rate even in the event of variations in the flow rate of the device for supplying solid particles. More precisely, the lower axial opening is preferably dimensioned with respect to the lowest flow rate which can be encountered and supplied by an upstream buffer volume in order to guarantee a substantially constant flow rate capable of filling the container with a homogeneous rain of solid particles.

In addition, each upper radial opening is advantageously used to guarantee a minimum filling of the buffer volume upstream of the lower axial opening and to compensate for any variations in flow rate by directing the solid particles also toward the dispensing device when the buffer volume upstream of the lower axial opening is filled. It is therefore understood that whatever the flow rate of solid particles received in the filling system, the latter will always be able to fill the container with a homogeneous rain of solid particles.

The invention may also comprise one or more of the following optional features, taken alone or in combination.

The axial opening can be delimited by a contour of substantially circular or polygonal shape which makes it possible to easily direct the solid particles toward the dispensing device.

The radial opening may have a shape delimited by a contour coinciding with the intersection of a cylinder (for example with a circular or polygonal section) and a surface of the receiving element in order to easily direct the solid particles toward the dispensing device, or have a shape which flares away from the axial opening in order to provide a variable distribution flow rate as a function of the storage height of the solid particles in the receiving body.

The axial opening and/or the radial opening may be at least partially concealable in order to control the flow rate of solid particles supplied to the dispensing device. Indeed, the selective concealment of the axial opening and/or of the radial opening can allow the filling system to be adaptable to the variations in flow rate of the same type of solid particles and/or to the similar or identical flow rate of different types of solid particles (for example in the case where the same silo is used at different times to store different cereals).

The receiving body can be rotatably mounted to optimize the storage and dispensing of the solid particles. Indeed, when the supply device is a conveyor belt, the latter generates an inclined jet at the outlet of the belt which may not be oriented in the axial (vertical) direction when it arrives in the filling system. The rotation of the receiving body therefore makes it possible to compensate for this asymmetry by filling the buffer volume of the receiving body more homogeneously. Moreover, its movement promotes settlement in its buffer volume. Further, the displacement of the receiving body makes it possible to optimize the distribution of the solid particles between the axial and radial openings. Thus, its movement promotes the passage of solid particles through the axial opening when its buffer volume is filled. Finally, its displacement makes it possible to angularly distribute any passage defect, such as a stuck object, at the axial and radial openings in order to make the flow of solid particles supplying the dispensing device more homogeneous.

The receiving body can be linked to a drive mechanism, such as an electric one, in order to be selectively displaced.

This makes it possible in particular to be able to control the displacement (start, speed, stop, etc.) according to the operating conditions of the filling system.

According to a particular version, the drive mechanism can be coupled to the dispensing device in order to make the displacement of the receiving element proportional to that of the scattering element, which for example makes it possible to use the motor of the dispensing device to displace the receiving element or vice versa.

The receiving body can also include at least one drive element intended to cooperate with the flow of solid particles to move the receiving body. This makes it possible in particular to be able to absorb part of the energy of the displacement of the solid particles so as not to have to add a drive mechanism.

The scattering element may comprise a rotating plate provided with fins of varying lengths so that the periphery of the plate extends substantially in the form of at least one spiral so as to fill the container in the form of a homogeneous rain of solid particles.

The separator element may further comprise a fixed casing surrounding the receiving body in order to guide the solid particles leaving the radial opening toward the dispensing device.

BRIEF DESCRIPTION OF THE DRAWINGS

Other features and advantages of the invention will emerge clearly from the description which is given hereinafter, by way of indication and in no way limitingly, with reference to the appended drawings, in which.

DETAILED DESCRIPTION OF AT LEAST ONE EMBODIMENT OF THE INVENTION

In the various figures, identical or similar elements are denoted by the same reference signs, possibly with a subscript character. The description of their structure and function is therefore not always repeated.

In the following, the orientations are the orientations of the figures. In particular, the terms "upper," "lower," "left," "right," "above," "below," "toward the front" and "toward the rear" are generally understood to mean with respect to the direction of illustration of the figures.

The invention generally relates to a filling system for a container such as a catalytic reactor or a storage silo intended to store solid particles such as catalyst in the form of granules or cereal grains. The filling system is intended to be mounted in the upper part of the container in order to dispense the solid particles with a homogeneous and regular rain, making it possible to fill the container progressively along an upper front forming a substantially flat and horizontal surface. This type of filling in fact makes it possible to maximize the quantity of solid particles stored in the container according to a very homogeneous distribution, but also to ensure the protection of the solid particles in particular by preventing their dust-generating attrition.

Figure 1:
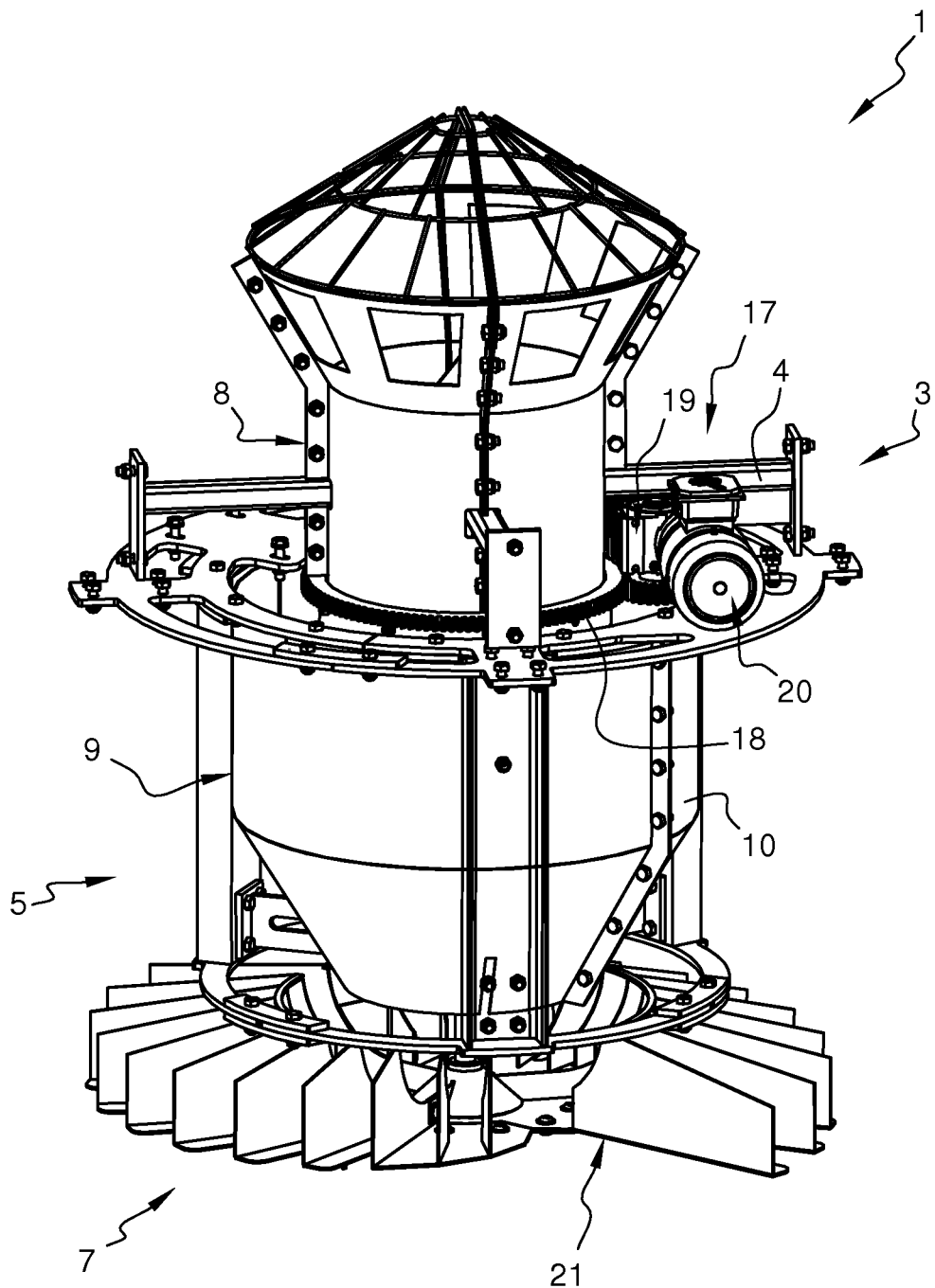
FIG. 1 is a perspective view of a filling system according to the invention.
Figure 2:
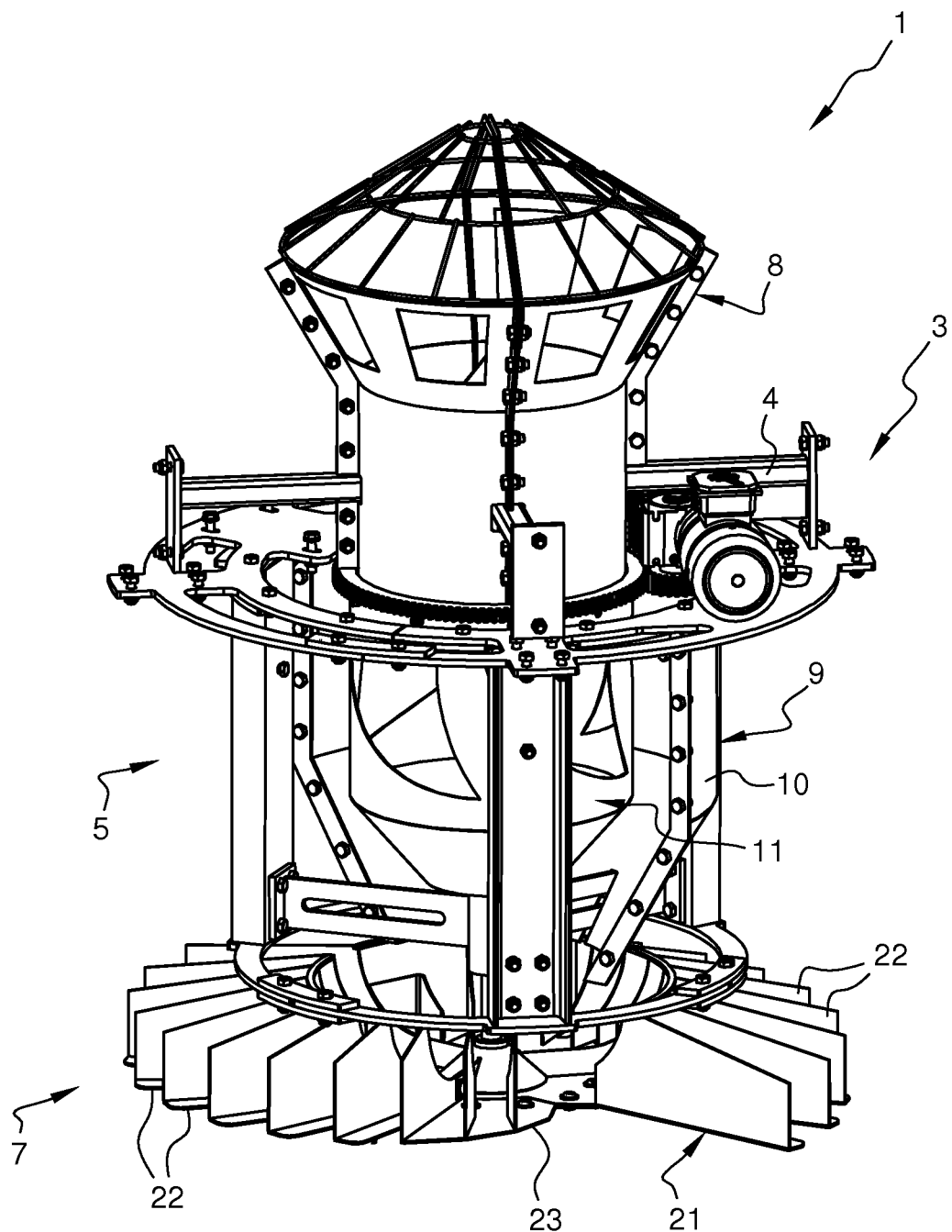
FIG. 2 is a perspective view similar to FIG. 1 in which a part of the casing has been removed in order to view a receiving body of the filling system according to the invention.
Figure 3:
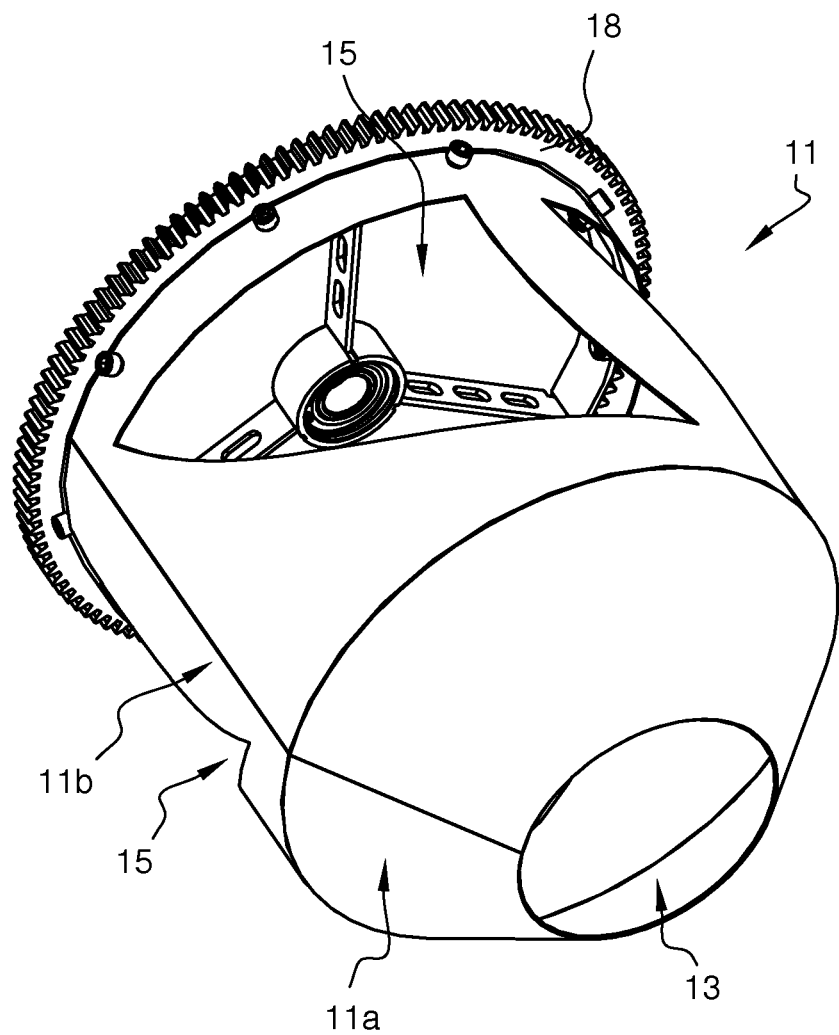
FIG. 3 is a perspective view of the receiving body.

In the example illustrated in FIGS. 1 to 3, the filling system 1 is designed to fill a silo with cereal grains. Of course, the invention can also be applied to other fields such as catalysts for the petroleum industry or more generally for the chemical industry.

In the example illustrated in FIGS. 1 to 3, the filling system 1 is arranged to cooperate with a device (not shown) for supplying solid particles. Typically, for cereal grain silos, the feed devices are generally belt conveyors discharging the cereal grains into a filling nozzle which is mounted on the roof of the silo. The filling system 1 according to the invention is therefore placed at the outlet of this filling nozzle in order to dispense the cereal grains homogeneously in the silo.

As can be seen in FIG. 1, the filling system 1 comprises a fixing device 3, a distribution device 5 and a device 7 for dispensing the solid particles. The fixing device 3 mainly comprises a frame 4 which is intended to support the filling system 1 in the silo and to be fixed to at least one wall of the silo and/or the filling nozzle of the silo.

The distribution device 5 is intended to receive and selectively distribute the solid particles coming from the filling nozzle of the silo toward the dispensing device 7. To this end, the device 5 mainly comprises a hopper 8 extended by at least one separator element 9. As can be seen in FIG. 1, the hopper 8 forms a funnel which is intended to channel the cereal grains from the filling nozzle of the silo toward the separator element 9. The hopper 8 is not an essential element of the invention. Thus, it could be removed or replaced by another type of delivery member.

According to the invention, the separator element 9 advantageously comprises a body 11 for receiving solid particles intended to guarantee a minimum flow of solid particles even in the event of variations in the flow rate of the device for supplying solid particles.

In the example of FIGS. 2 and 3, the receiving body 11 comprises a frustoconical part 11a and a tubular part 11b formed securely. The lower end of the frustoconical part 11a comprises an axial opening 13, the frustoconical part 11a flaring away from the axial opening 13. The frustoconical part 11a therefore makes it possible to direct the solid particles by gravity toward the axial opening 13. In addition, the frustoconical part 11a is extended by the tubular part 11b comprising at least one radial opening 15 (four in FIGS. 2 and 3). The axial orientation in the usage position of the filling system 1 substantially corresponds to that of the action of gravity. Each radial opening 15 is advantageously formed without it being necessary to move parts or closing devices.

Advantageously according to the invention, the axial opening 13 is intended to continuously supply the dispensing device 7 with solid particles while each radial opening 15, located upstream of the axial opening 13, is arranged to direct the solid particles toward the dispensing device 7 beyond a predetermined amount of solid particles stored in the receiving body 11. Advantageously, the two parts 11a, 11b of the latter allow the solid particles leaving each radial opening 15 not to meet those leaving the axial opening 13 before arriving in the dispensing device 7.

The axial opening 13 can be of various shapes. By way of example, the axial opening 13 may be delimited by a contour of substantially circular or polygonal shape in order to easily direct the solid particles toward the dispensing device 7. In the example of FIG. 3, it can be seen that the axial opening 13 is delimited by a circular contour. To be exact, the solid particles pass through an annular space formed by the axial opening 13 delimited by a circular contour in the center of which a drive shaft of the dispensing device 7 is present. Of course, other forms of axial opening 13 can be envisaged without departing from the scope of the invention.

The number of radial openings 15 is at least equal to one and cannot be limited to four as illustrated in FIGS. 2 and 3. Likewise, each radial opening 15 may also be of various shapes. By way of example, each radial opening 15 can thus be delimited by a contour coinciding with the intersection of a cylinder and a surface of the receiving element in order to easily direct the solid particles towards the dispensing device 7. The section of the cylinder can thus be substantially circular or polygonal. As a variant, at least one radial opening 15 may have a shape which flares away from the axial opening 13 as illustrated in FIGS. 2 and 3. This shape in fact makes it possible to offer a variable distribution flow rate as a function of the storage height of the solid particles in the receiving body 11. Of course, other forms of radial opening 15 can be envisaged without departing from the scope of the invention.

Advantageously according to the invention, the filling system 1 therefore comprises a receiving body 11 capable of maintaining a minimum flow rate even in the event of variations in the flow rate of the device (not shown) for supplying solid particles. More precisely, the lower axial opening 13 is preferably dimensioned with respect to the lowest flow rate which can be encountered and supplied by an upstream buffer volume (volume of solid particles stored in the receiving body 11) in order to guarantee a substantially constant flow rate capable of filling the container at all times with a homogeneous rain of solid particles.

In addition, each upper radial opening 15 is advantageously used to guarantee a minimum filling of the buffer volume upstream of the lower axial opening 13. Each upper radial opening 15 also makes it possible to compensate for any variations in the flow rate of the supply device (not shown) by also, where appropriate, directing the solid particles toward the dispensing device 7 when the buffer volume upstream of the lower axial opening 13 is filled. It is therefore understood that whatever the flow rate of solid particles received in the filling system, the latter will always be able to supply the dispensing device 7 so that it fills the container with a homogeneous rain of solid particles.

Preferably according to the invention, the receiving body 11 is rotatably mounted to optimize the storage and dispensing of the solid particles. Indeed, when the supply device is a conveyor belt, the latter generates an inclined jet at the outlet of the belt which may not be oriented in the axial (vertical) direction when it arrives in the filling system. The rotation of the receiving body therefore makes it possible to compensate for this asymmetry by filling the buffer volume of the receiving body more homogeneously. Moreover, its movement promotes settlement in its buffer volume (volume of solid particles stored in the receiving body 11 upstream of the axial opening 13). Further, the displacement of the receiving body 11 makes it possible to optimize the distribution of the solid particles between the axial and radial openings 13, 15. Thus, its movement promotes the passage of solid particles through the axial opening 13 when its buffer volume is filled. Finally, its displacement makes it possible to angularly distribute any passage defect, such as a stuck object, at the axial and radial openings 11, 15 in order to make the flow of solid particles supplying the dispensing device 7 more homogeneous.

The receiving body 11 can be linked to a drive mechanism 17 in order to be selectively displaced. This makes it possible in particular to be able to control the displacement (start, speed, stop, etc.) according to the operating conditions of the filling system. Different types of drive mechanism 17 can be envisaged, for example hydraulic, pneumatic or electric. In the example illustrated in FIGS. 1 to 3, a drive mechanism 17 of the electric type is shown. The drive mechanism 17 mainly comprises a toothed wheel 18 secured to the tubular part 11b of the receiving body 11, a reduction gear 19 and a motor assembly 20. Consequently, it is understood that the rotation of the receiving body 11 can be actuated without the mandatory presence of an operator. By way of example, the activation of the rotation of the receiving body 11 could be slaved to the activation of the feed device (not shown) or the presence of solid particles in the receiving body 11.

As a variant, the receiving body 11 can also include at least one drive element (not shown) intended to cooperate with the flow of solid particles to move the receiving body 11. This makes it possible in particular to be able to absorb part of the energy of the displacement of the solid particles so as not to have to add a drive mechanism 17 to the filling system 1. By way of example, the drive element could be formed by a curved or rectilinear rib mounted on the inner wall of the receiving body 11 so that the stop of part of the axial displacement of the solid particles against these ribs induces a rotation of the receiving body 11. It is therefore understood that the rotation of the receiving body 11 would be dependent on the flow rate of solid particles arriving in the receiving body 11.

According to another variant (not shown), the receiving body 11 can also be coupled to the dispensing device 7 in order to make the displacement of the receiving body 11 proportional to that of the scattering element 21, which for example makes it possible to use the motor of the dispensing device 7 to displace the receiving body 11 or vice versa. Thus, in no way limitingly, a toothed wheel secured to the tubular part 11b of the receiving body 11 could be coupled by a reduction gear train (for example an epicyclic train) to the motor of the dispensing device 7 or to a transmission shaft of the motor such as, for example, that of the scattering element 21. Typically, the receiving body 11 could rotate between two and eight times more slowly than the plate 23, such as, for example, four times more slowly. However, conversely, nothing prevents the receiving body 11 from rotating at the same speed as or faster than the scattering element 21.

The separator element 9 may further comprise a fixed casing 10 surrounding the receiving body 11 in order to guide the solid particles leaving each radial opening 15 toward the dispensing device 7.

The dispensing device 7 can be of different types. It comprises at least one scattering element 21 intended to fill the container by a drive shaft connected to a motor (not shown) and intended to fill the container with solid particles in a homogeneous manner and, preferably, in the form of a homogeneous rain of solid particles. In no way limitingly, the scattering element 21 may comprise, as illustrated in FIGS. 1 and 2, a rotating plate 23 provided with fins 22 making it possible to eject, by centrifugal force, the solid particles in a homogeneous distribution. As visible in FIGS. 1 and 2, the fins 22 preferably have scalable lengths so that the periphery of the plate 23 extends substantially in the form of a spiral or of several spirals so as to eject the solid particles along several rays capable creating the dispensing in the form of a homogeneous rain.

Of course, other dispensing devices 7 can be used, for example of the strap type or of the whip type.

The invention is not limited to the embodiments and variants described here, and other embodiments and variants will become clearly apparent to a person skilled in the art.

Thus, other geometries and dimensions of axial and radial openings 13, 15 can be envisaged without departing from the scope of the invention. It is also possible for radial openings 15 to be present on the frustoconical part 11a. Indeed, on the one hand, with the same receiving body 11, it is possible to provide radial openings 15 near the start of the tubular part 11b in order to leave a sufficient buffer volume, and, on the other hand, a totally frustoconical receiving body 11 can also be envisaged, which would make it necessary to provide radial openings 15 on a non-tubular part, unlike the explanation above.

Further, additionally, one or more of the axial and radial openings 13, 15 may be partially or fully concealable, for example, by means of a diaphragm, or a flap, which is selectively movable in order to adjust the free passage section of the axial and radial openings 13, 15. In fact, selective concealment would make it possible to adapt to the flow rate of the same type of solid particles or to adapt to the flow rate of different types of solid particles (for example in the case where the same silo is used at different times to store different cereals). Thus, in no way limitingly, in particular at the start of loading, all the openings 13, 15 of the receiving body 11, or only the axial opening 13, could be concealed in order to fill the buffer volume more quickly and to ensure, after reopening, a more homogeneous supply to the dispensing device 7 from the start of filling of the container.

It can also be envisaged for the filling system 1 to comprise a receiving body 11 of different geometries and dimensions without departing from the scope of the invention. The filling system 1 can also include several receiving bodies 11 of identical shape or not, mounted coaxially in order to optimize the distribution of the solid particles.

Finally, it can also be envisaged for the filling system 1 to comprise several dispensing devices 7 of identical geometry or not, mounted coaxially in order to optimize the dispensing of the solid particles. In no way limitingly, several scattering elements 21 (for example between two and five) could thus each comprise, as illustrated in FIG. 1, a rotating plate 23 provided with fins 22 making it possible to eject, by centrifugal force, the solid particles in a homogeneous distribution.

The invention claimed is:

1. A filling system for a container intended to store solid particles, the system comprising
    a device configured to distribute solid particles, which has at least one separator element configured to receive and selectively distribute the solid particles toward a dispensing device, the separator element comprising a receiving body configured to receive the solid particles, one end of which has an axial opening configured to continuously feed the dispensing device,
    the dispensing device comprising at least one scattering element configured to homogeneously fill the container with the solid particles, which is driven by a drive shaft passing through the axial opening,
    wherein the receiving body comprises a frustoconical part and a tubular part in one piece, the frustoconical part comprising the axial opening at one end and flares away from the axial opening at the other end, the frustoconical part being extended at the other end, by the tubular part comprising at least one radial opening which is located upstream of the axial opening and is arranged to direct the solid particles, without encountering those exiting the axial opening before arriving in the dispensing device, from a predetermined amount of solid particles stored in the frustoconical part of the receiving body.

2. The filling system according to claim 1, wherein the axial opening is delimited by a contour of substantially circular or polygonal shape.

3. The filling system according to claim 1, wherein the radial opening is delimited by a contour coinciding with the intersection of a cylinder and a surface of the receiving element.

4. The filling system according to claim 1, wherein the radial opening has a contour with a shape which flares away from the axial opening in order to offer a variable distribution flow rate as a function of the storage height of the solid particles in the receiving body.

5. The filling system according to claim 1, wherein the axial opening is at least partially concealable in order to control the flow rate of solid particles supplied to the dispensing device.

6. The filling system according to claim 1, wherein the radial opening is at least partially concealable in order to control the flow rate of solid particles supplied to the dispensing device.

7. The filling system according to claim 1, wherein the receiving body is rotatably mounted to optimize the storage and distribution of the solid particles.

8. The filling system according to claim 7, wherein the receiving body is linked to a drive mechanism in order to be selectively displaced.

9. The filling system according to claim 8, wherein the drive mechanism is coupled to the dispensing device in order to make the displacement of the receiving element proportional to that of the scattering element.

10. The filling system according to claim 7, wherein the receiving body comprises at least one drive element intended to cooperate with the flow of solid particles to move the receiving body.

11. The filling system according to claim 1, wherein the scattering element comprises a rotating plate provided with fins of varying lengths so that the periphery of the plate extends substantially in the form of at least one spiral so as to fill the container in the form of a homogeneous rain of solid particles.

12. The filling system according to claim 1, wherein the separator element further comprises a fixed casing surrounding the receiving body in order to guide the solid particles leaving the radial opening toward the dispensing device.

13. The filling system according to claim 1, wherein the solid particles comprise grain.

14. A method for filling a silo with grain comprising:
    providing a silo;
    providing grain to a device for distributing the grain, the device having at least one separator element intended to receive and selectively distribute the grain toward a dispensing device, the separator element comprising a receiving body for receiving the grain, one end of which has an axial opening for continuously feeding the grain to the dispensing device;
    the dispensing device comprising at least one scattering element for homogeneously filling the container with the grain, which is driven by a drive shaft passing through the axial opening;
    wherein the receiving body comprises a frustoconical part and a tubular part in one piece, the frustoconical part comprising the axial opening at one end and flares away from the axial opening at the other end, the frustoconical part being extended, at the other end, by the tubular part comprising at least one radial opening which is located upstream of the axial opening and is arranged to direct the grain, without encountering grain exiting the axial opening before arriving in the dispensing device, from a predetermined amount of grain stored in the frustoconical part of the receiving body in order to guarantee a minimum flow of the grain to the silo even in the event of variations in the flow rate of the grain; and filling the silo with a homogeneous distribution of the grain.

15. The method according to claim 14, further comprising maximizing the amount of the grain stored by filling the silo.

* * * * *